United States Patent [19]
Takaya et al.

[11] Patent Number: 5,350,261
[45] Date of Patent: Sep. 27, 1994

[54] TWIST DRILL

[75] Inventors: Sueji Takaya; Kazuo Takasaki; Kazuaki Tone, all of Gifu, Japan

[73] Assignee: Mitsubishi Materials Corporation, Tokyo, Japan

[21] Appl. No.: 23,686

[22] Filed: Feb. 26, 1993

[30] Foreign Application Priority Data

| Mar. 12, 1992 | [JP] | Japan | 4-053912 |
| Mar. 18, 1992 | [JP] | Japan | 4-062672 |
| Mar. 26, 1992 | [JP] | Japan | 4-068629 |

[51] Int. Cl.$^5$ .............................. B23B 51/02
[52] U.S. Cl. .................... 408/229; 408/230
[58] Field of Search ............ 408/199, 227, 229, 230, 408/715

[56] References Cited
FOREIGN PATENT DOCUMENTS

| 213911 | 9/1987 | Japan | 408/227 |
| 260713 | 10/1988 | Japan | 408/227 |
| 6412716 | 4/1989 | Japan . | |
| 142116 | 6/1991 | Japan | 408/705 |

*Primary Examiner*—Steven C. Bishop
*Attorney, Agent, or Firm*—Cushman, Darby & Cushman

[57] ABSTRACT

A twist drill is disclosed. The twist drill comprises a substantially cylindrical tool body having a rotational axis therethrough, a front portion, a rear portion, a plurality of web thickness, a front flank face, a plurality of flutes formed on an outer peripheral surface thereof and extending to the front flank face, and a land disposed between a pair of the flutes. The flute has a wall portion facing toward the rotational direction of the tool body. A cutting edge is formed at an intersection between the wall portion of the flute and the front flank face. The web thickness at the rear portion of the tool body is smaller than the web thickness at the front portion of the tool body.

10 Claims, 7 Drawing Sheets

TWIST DRILL

BACKGROUND OF THE INVENTION

The present invention relates to a twist drill having a tool body formed with spiral grooves or flutes in the outer peripheral surface of the tool body, and in particular, the present invention relates to a twist drill which can smoothly discharge cuttings which are not broken into chips, and which has high rigidity against cutting resistance. The present invention further relates to an improved twist drill having cutting edges which are processed with honing and are processed with a cross-type web thinning on a front flank face of the tool body.

In general, in a twist drill having spiral flutes in which the helix angles are large, the cutting resistance can be decreased since the axial rake angles of cutting edges are large and the cutting performance is increased. However, when the helix angle of the flutes is set too large, the force pushing up chips or cuttings toward the rear end of the flutes is converted to frictional resistance between the chips and the flutes, and the total lengths of the flutes are long, so that the chips tend to cause clogging when stuffed in the flutes. Furthermore, in general, the web taper in which the web thickness is gradually increased toward the rear end of a tool body is adapted to a twist drill. In such a twist drill as well, the cross sections of the flutes are gradually decreased toward the rear end thereof, so that the chips tend to clog when stuffed in the flutes.

Figure 1:
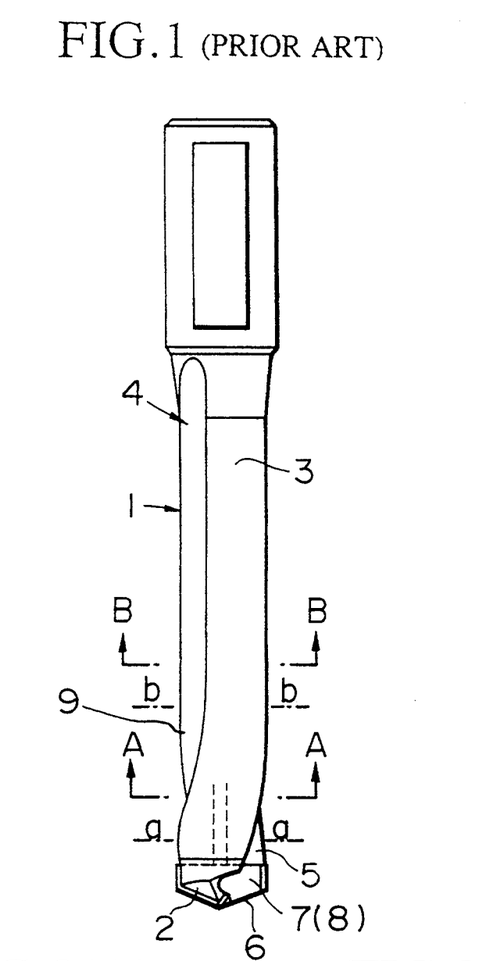
FIG. 1 is a side view of a conventional twist drill.
Figure 2A:
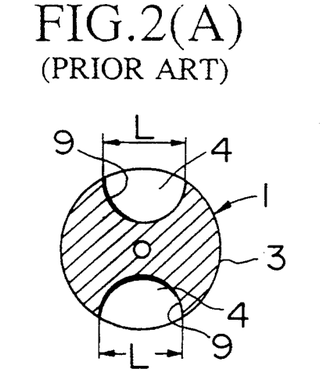
FIG. 2(A) is a cross-sectional view taken along the line 2A—2A in FIG. 1.
Figure 2B:
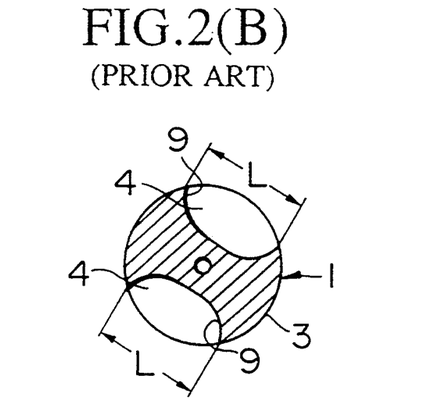
FIG. 2(B) is a cross-sectional view taken along the line 2B—2B in FIG. 1.

Therefore, there is proposed a twist drill which can ensure smooth discharge of chips or cuttings and can control the increase of the cutting resistance, for example, in Japanese Utility Model Application, Laid-Open No. Sho 64-12716. As shown in FIGS. 1 and 2(a) and 2(b) of this Utility Model Application, the twist drill has a cylindrical tool body 1. A pair of spiral grooves or flutes 4 opening to the front flank face 2 of the tool body 1 is formed in the outer peripheral surface 3 of the tool body 1. A cutter bit 7 having cutting edges 6 is soldered at a front wall portion 5 of the flute 4 facing in the rotational direction of the tool body 1. The cutter bit 7 is disposed such that the cutting face 8 is smoothly connected to the wall portion 5 of the flute 4. The front portion of the flute 4, from the front end of the tool body 1 to the cross-section taken along the line 2A—2A, has a constant helix angle to provide a predetermined axial rake angle to the cutting edge 6. The helix angle of the middle portion of the flute 4, in a cross-section taken along the line 2A—2A to the cross-section taken along the line 2B—2B, is gradually decreased from the helix angle at the line 2A—2A to 0°. As shown in FIGS. 2(A) and 2(B), the ratio of the length (L+L) of the flute to the circumferential length of the tool body 1 at the middle portion of the flute 4, in a cross-section taken along the line 2A—2A to the cross-section taken along the line 2B—2B, is larger than the ratio of the length (L+L) of the flute at the front portion of the flute 4 to cross-section taken along line 2A—2A. The rear portion of the flute 4, from the cross-section taken along line 2B—2B to the rear end, is formed in a straight groove having a helix angle of 0°, so that the total length of the flute 4 is smaller than in an ordinary twist drill. For this construction, the increase of the cutting resistance can be prevented and the resistance caused due to the discharge of chips can be reduced.

However, in the prior art drill in FIG. 1, the frictional resistance tends to increase since chips rub against the flute and the inner wall of the hole machined by the cutting edge. As a result, the discharge of chips is not smooth and efficient. That is, in the twist drill as above, the width of the flute increases toward the rear end of the flute (in which chips tend to accumulate), and the cross section of the rear end of the flute is large. Therefore, when cuttings are curled at the cutting face adjacent the cutting edge and are broken into chips, the chips can be smoothly discharged through the rear portion of the flute having a large cross section. In contrast, when the cuttings are not broken into chips and are spirally elongated, the cuttings tend to accumulate in the flute. This is due to the fact that the cuttings must flow along a closed space defined by the flute and the inner surface of the machined hole, and the flute has a constant depth through the total length of the flute. This causes the same problem as the prior art drill.

Moreover, in the above twist drill, the rigidity of the tool body is not sufficient since the greater part of the tool body has a wide flute width L and a small cross section, and therefore, the tool body tends to vibrate, and in certain circumstances, the tool body is broken.

Figure 3:
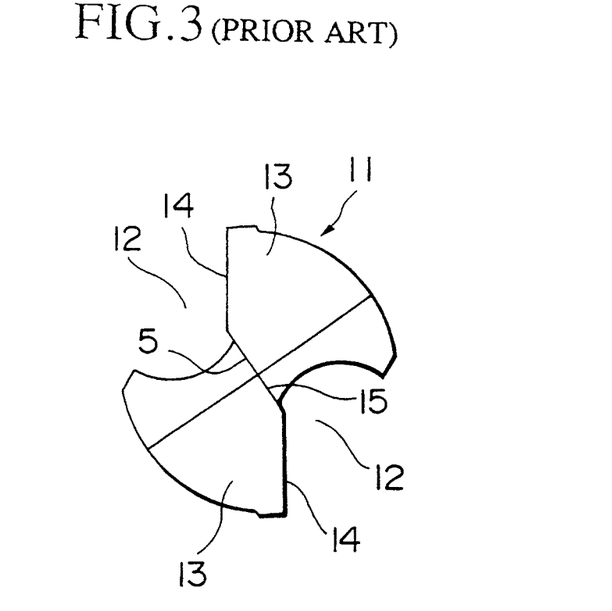
FIG. 3 is an end view of another conventional twist drill.
Figure 4:
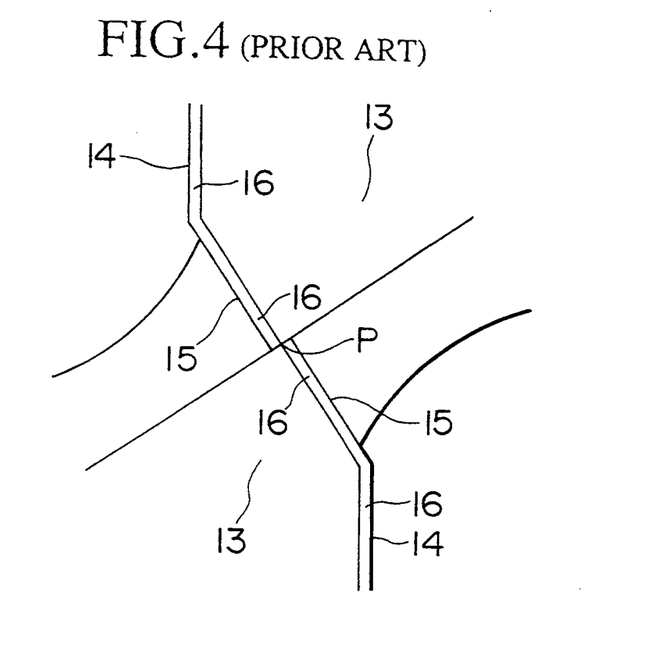
FIG. 4 is an enlarged end view of the portion in the vicinity of the rotational axis of the twist drill in FIG. 3.

As shown in FIGS. 3 and 4, another example of a twist drill is provided. The twist drill has a tool body 11 made of cemented carbide. A pair of spiral flutes 12 are formed in the outer peripheral surface of the tool body 11. A cutting edge 14 is formed at the intersection between the front flank face 13 of the tool body 11 and a wall portion of the flute 12 facing toward the cutting direction of the tool body 11. The front flank face 13 of the tool body 11 is processed with cross-type web thinning, so that two second cutting edges 15 extending from the radially inner end of the cutting edge 14 to the vicinity of the rotational axis of the tool body 11 are formed. Moreover, since the tool body 11 is made of cemented carbide, slight chambers (hereinafter referred as "honing portion") 16 are formed at the cutting edge 14 and the second cutting edge 15 by honing so as to prevent chipping thereof.

In the twist drill constructed as above, there is substantially no chisel edge, which causes an increase of the thrust load and vibration of the tool body when the cutting edge 14 engages a workpiece, and therefore, the stability of the tool body 11 is ensured when the cutting edge 14 is engaging a workpiece and the power consumption for cutting operations can be reduced.

However, in the twist drill, since the second cutting edges 15 formed by the cross-type thinning are formed with the honing portions 16, the honing portions 16 are disposed at a slight distance, and a pin edge portion P having a slight thickness exists at the rotational center of the tool body 11. As a result, the pin edge portion P is easily broken when the twist drill vibrates.

SUMMARY OF THE INVENTION

It is therefore an object of the present invention to provide a twist drill capable of smooth discharge of cuttings which are not broken into chips. Another object of the present invention is to provide a twist drill having a flute of large cross section, so that cuttings or chips can be discharged more easily, and having high rigidity against cutting resistance. A further object of the present invention is to provide a twist drill having advantages of a cross-type thinning drill, and capable of preventing breakage of the center portion of the front face of the tool body.

According to the present invention, the web thickness at the rear portion of the tool body is smaller than the web thickness at the front portion of the tool body. In the above twist drill, since the distance from the inner wall of a machined hole to the bottom wall of the flute at the rear portion of the tool body is larger than the distance from the inner wall of a machined hole to the bottom wall of the flute at the front portion of the tool body, contact between cuttings or chips and the inner surface of the hole and the flute can be effectively prevented, and smooth discharge of chips can be ensured. The flute-width ratio at a cross-section taken perpendicular to the axis of the-tool body at the rear end of the tool body is preferably larger than the flute-width ratio at the front end of the tool body. In such a twist drill, the area of the cross section at the rear portion of the tool body is large, so that the smooth discharge of chips is further facilitated.

The flute preferably consists of a spiral portion opened to the front flank face, and a straight portion extending from the rear end of the spiral portion toward the rear end and extending in parallel to the axis of the tool body. That is, since the rigidity of a tool body having straight flutes is larger than that of a tool body having a spiral flute, the rigidity of the tool body having a small web thickness is compensated for, and the discharge of cuttings at the rear portion of the tool body can be further increased.

The cutting edges are preferably inclined at a predetermined angle in a direction counter to the rotational direction thereof with respect to the longitudinal center line of the cross section of the straight portion, and the certain angle is set in a range of 30° through 90°. In general, the cutting resistance consists of a principal force directed in the direction perpendicular to the cutting edge, i.e., counter to the rotational direction, and a back force directed toward the axis of the tool body. The vector of the cutting resistance is the resultant force of the vector of the principal force and the vector of the back force. The vector of the cutting resistance is pivoted toward the radially inner direction, in general, at an angle of about 30°. In the above twist drill, the relationship between the locations of the cutting edges and the center line of the cross section of the straight portion is selected so that the modulus of the cross section is large with respect to the cutting resistance having the above orientation. That is, since the cross section of the tool body can be regarded as substantially of a rectangular configuration, the straight portion of the invention may be considered as a beam having a rectangular cross section. Therefore, when the principal force of the cutting resistance is inclined at an angle of 30° with respect to the longitudinal direction of the cross section of the straight portion, the cutting resistance is directed toward the longitudinal direction of the cross section, so that the modulus of the cross section is maximal with respect to the direction of the cutting force, and resistance against bending force exerted on the tool body is maximal. The inventors of the present invention have found that when the direction of the principal force is in the range of $-30°$ through 30° with respect to the location of the cutting edge in which the modulus of section is maximal, the modulus of the cross section of the straight portion can be very large. For this reason, the cutting edge is pivoted toward the radially inner direction, in the range of 30° through 90°, with respect to the longitudinal center line of the cross section of the straight portion.

In the twist drill having the above construction, in spite of having a large flute-width ratio at the rear portion of the tool body, the modulus of the cross section is not decreased. As a result, in the above twist drill, the smooth discharge of chips can be ensured since the area of the cross section of the flute is large, and the rigidity against the bending force due to the cutting resistance can be ensured.

Furthermore, in accordance with the present invention, web thinning portions are preferably formed on the front flank face including a web portion. A pair of second cutting edges are formed on the web portion by a thinning process. The second cutting edges are separated from each other in the direction perpendicular to the second cutting edge when viewed from the front end of the tool body. A chisel edge connecting the radially inner ends of the second cutting edges is formed on the center of the front flank face. The length of the chisel edge is set in a range of 0.02 D through 0.05 D.

In order to reduce thrust force produced in the drilling operation, the length of the chisel edge should be short. On the other hand, in order to prevent breakage of the center portion in the vicinity of the rotational axis of the tool body, the chisel edge should have a certain length. The minimum length and the maximum length of the chisel edges, which satisfy the above two requirements, have a mutual relationship with the diameter of the tool body. That is, when the diameter of the tool body is large, the thrust force is principally large and vibration does not tend to occur, so that the length of the chisel edge can be long. Therefore, in the present invention, the length of the chisel edge is defined by a multiple of the drill diameter.

The above numerical limitation was obtained by numerous experiments using many twist drills of various diameters. The range of the length of the chisel edge can be applied to twist drills of any diameter, in which advantages of conventional cross-thinning type drills can be obtained.

DETAILED DESCRIPTION OF THE INVENTION

A preferred embodiment of the present invention will be explained with reference to FIGS. 5 through 11. In the figures, numeral 110 indicates a tool body. The tool body is made of steel, for example, high speed steel. A pair of spiral flutes 111 is formed in the peripheral outer surface of the tool body 110. A cutter bit 112 is soldered at the front center of the tool body 110. The cutter bit 112 extends over opposite peripheral outer surfaces of the tool body 110. A cutting edge 113 is formed at the intersection between a wall portion of the flute 111 facing toward the cutting direction and the front flank face of the tool body 110. Numeral 114 indicates an oil hole.

Figure 8:
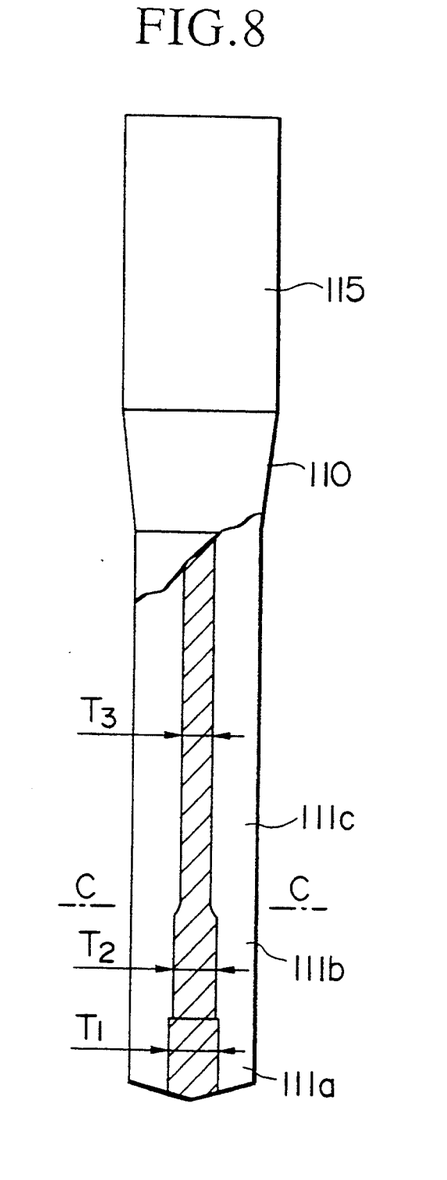
FIG. 8 is an axial cross-sectional view of the twist drill for explaining the web thickness of the twist drill in FIG. 5.

As shown in FIG. 8, the flute 111 consists of a first spiral portion 111a, a second spiral portion 111b connected to the rear end of the first spiral portion 111a and straight portion 111c connected to the rear end of the second spiral portion 111b. The first spiral portion 111a opens to the front flank face of the tool body 110 and twists at a constant helix angle. The second spiral portion 111b twists in the same direction as the first spiral portion 111a. The helix angle of the second spiral portion gradually decreases toward the rear end of the tool body 110 from the rear end of the first spiral portion 111a. The straight portion 111c extends in parallel with the rotational axis of the tool body 110 from the rear end of the second spiral portion 111b toward the rear end of the tool body 110.

Figure 7A:
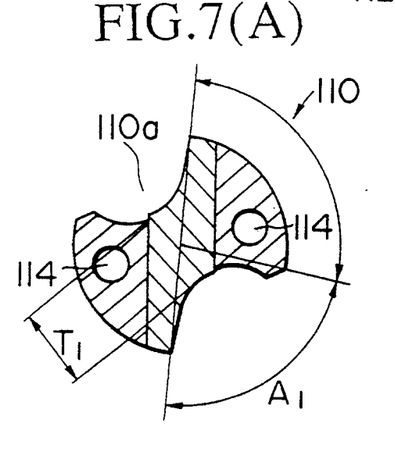
FIG. 7(A) is a cross-sectional view taken along the line 7A—7A in FIG. 5.

The helix angle of the first spiral portion 111a is set at 20°. The first spiral portion 111a extends from the front end of the tool body 110 toward the point indicated by the symbol "a" in FIG. 5. The length $L_1$ of the first spiral portion 111a is set in a range of 1 D through 2 D (wherein D is the diameter of the tool body 110), and is set at 1.5 D in this embodiment. Along the first spiral portion 111a, the web thickness $T_1$ at the cutter bit 112 is set in a range of 0.25 D through 0.35 D, and is set at 0.31 D in this embodiment; and the web thickness $T_2$ of the tool body 110 is set in a range of 0.22 D through 0.33 D, and is set at 0.3 D in this embodiment, as shown in FIG. 7.

Figure 5:
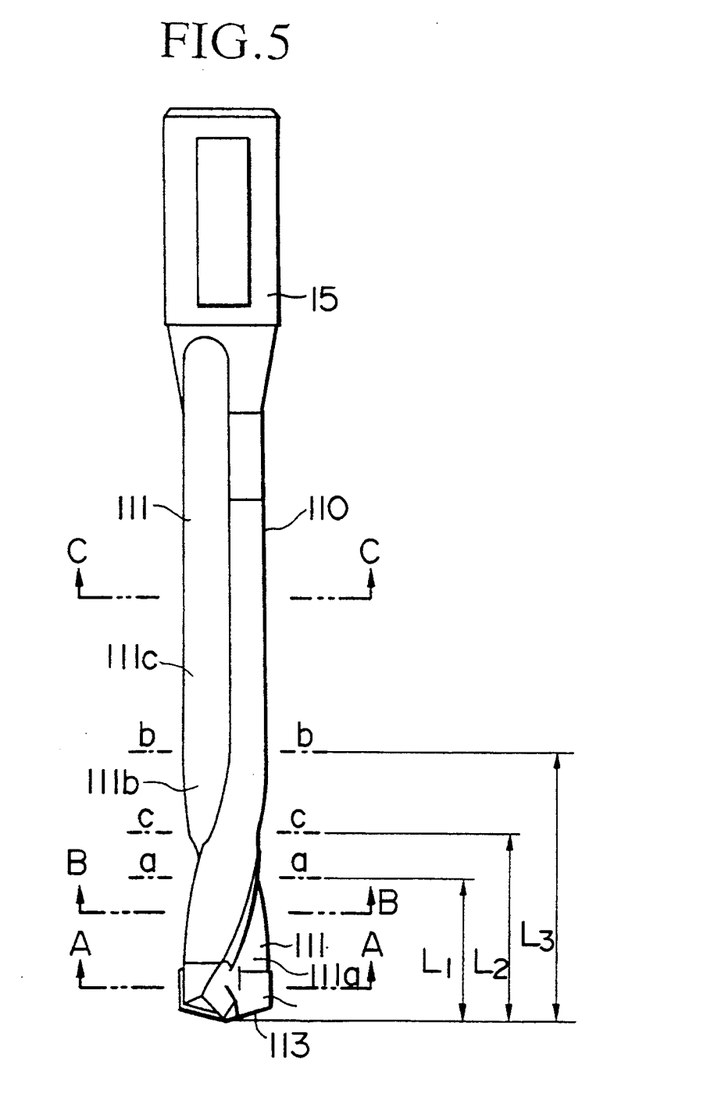
FIG. 5 is a side view of a twist drill according to an embodiment of the invention.
Figure 6:
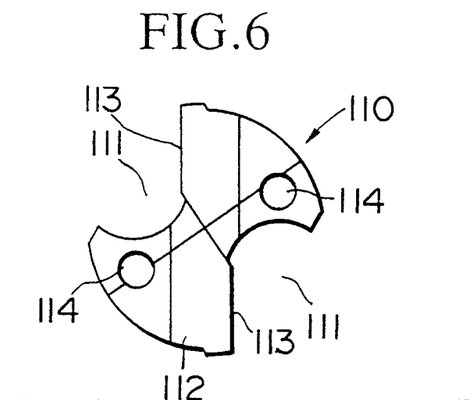
FIG. 6 is a side view of the twist drill in FIG. 5.
Figure 7B:
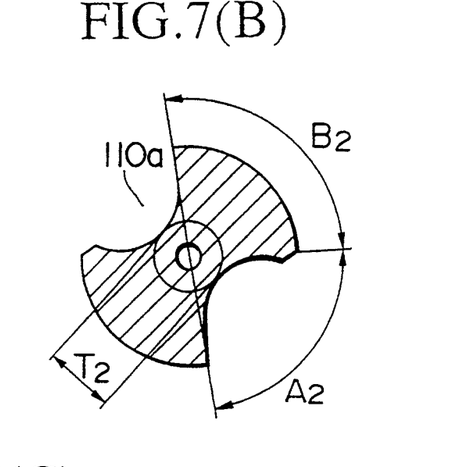
FIG. 7(B) is a cross-sectional view taken along the line 7B—7B in FIG. 5.
Figure 7C:
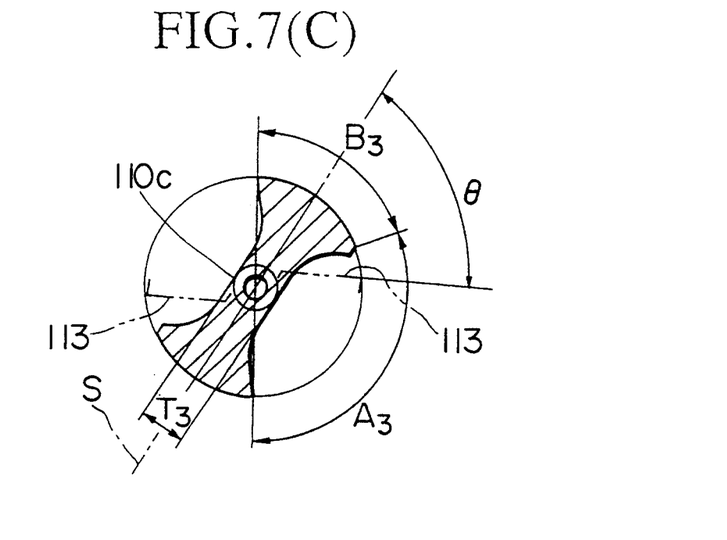
FIG. 7(C) is a across-sectional view taken along the line 7C—7C in FIG. 5.

The second spiral portion 111b extends from the point indicated by the symbol "a" toward the point indicated by the symbol "b" in FIG. 5. The helix angle of the second spiral portion 111b gradually decreases from 20° to 0°, from point a to point b. The second spiral portion 111b has a web thickness $T_2$ at the front end thereof. The web thickness of the second spiral portion 111b decreases in the vicinity of the point indicated by the symbol "c" so that the web thickness at the rear side of point c is set at $T_3$. The length $L_2$ from the front end of the tool body 110 to point c is set in a range of 1.5 D through 2.5 D, and is set at 2.0 D in this embodiment. The rear side from the rear end of point c of the second spiral portion 111b is defined as the straight portion 111c. The straight portion 111c has a cross-section as shown in FIG. 7(C), and extends toward a shank 115 of the tool body 110. The length $L_3$ from the front end of the tool body 110 to point c is set at a range of 2 D through 4 D, and is set at 3 D in this embodiment.

The ratio of arc length of the flute 111 to arc length of the land of the tool body 110 at a cross-section taken perpendicular to the axis of the tool body 110 (hereinafter referred to simply as "flute-width ratio") is increased on the way toward the straight portion 111c from the first spiral portion 111a. That is, as shown in FIGS. 7(A), 7(B), and 7(C), the flute-width ratio $A_1/B_1$ of the first spiral portion 111a is constant in a range of 0.5 through 0.8, the flute-width ratio $A_3/B_3$ of the straight portion 111c is constant in a range of 1.0 through 1.5. In contrast, the flute-width ratio $A_2/B_2$ of the second spiral portion 111b from point a to just at the front side of point c gradually increases from the ratio equal to $A_1/B_1$, and increases to the ratio equal to $A_3/B_3$ suddenly at point c. The flute-width ratio $A_2/B_2$ of the second spiral portion 111b from point c toward the rear end of the tool body 110 is constant at the ratio equal to $A_3/B_3$. In other embodiments, the flute-width ratio $A_3/B_3$ of the second spiral portion 111b can be gradually increased toward point b from point a.

Machining of the flute 111 constructed as the above is as follows. First, the first spiral portion 111a having a helix angle of 20° is formed by machining with a ball end mill in such way that the tool body 110 is fed with respect to the ball end mill toward the front end thereof while rotating the tool body 110 about the axis thereof. When the ball end mill reaches point a, the rotational speed of the tool body 110 gradually decreases toward point b at which the rotational speed of the tool body 110 is zero. For such a process, the helix angle of the second spiral portion 111b gradually decreases from 20° to 0°. Furthermore, the cutting depth of the ball end mill is enlarged when the ball end mill reaches point c, so that the web thickness is changed from $T_2$ to $T_3$. After the ball end mill reaches point b, the tool body 110 is fed to the front end thereof without rotating the tool body 110, so that the straight portion 111c having a cross section as shown in FIG. 7(C) is formed.

In the twist drill having the above-constructed flute 111, since the depth of the flute 111 at the rear end of the tool body 110 is larger than the depth at the front end of the tool body 110, contact between cuttings or chips and the inner wall of the machined hole by the twist drill and the flute can be effectively prevented, and smooth discharge of chips can be ensured. Moreover, the flute-width ratio increases toward the rear end of the tool body 110 from the front end thereof, the area of the cross section at the rear end of the tool body 110 is very large, and the straight portion 111c exists at the rear end of the tool body 110. By virtue of this construction, the chips can be more easily discharged. Furthermore, although the rear end of the tool body 110 has a large flute-width ratio and a small web thickness, the rigidity of the tool body 110 is ensured since the rear end thereof is formed with the straight portion 111c.

The cross section of the straight portion 111c has a substantially rectangular configuration as shown in FIG. 7(C) since that portion has a large flute-width ratio $A_3/B_3$ and a small web thickness. The cutting edges 113 are arranged with respect to the longitudinal center line S of the cross section of the straight portion 111c such that the cutting edges 113 are inclined at a certain angle counter to the cutting direction of the cutting edges 113 with respect to the center line S. The inclination angle of the cutting edges is set in a range of 30° through 90°, and is set at 60° in this embodiment. Of course, the angle between center line S and the cutting edges 113 can be set in the range of 30° through 90°, and may preferably be set in the range of 40° through 80°, and may be more preferably set in the range of 50° through 70°.

Figure 9:
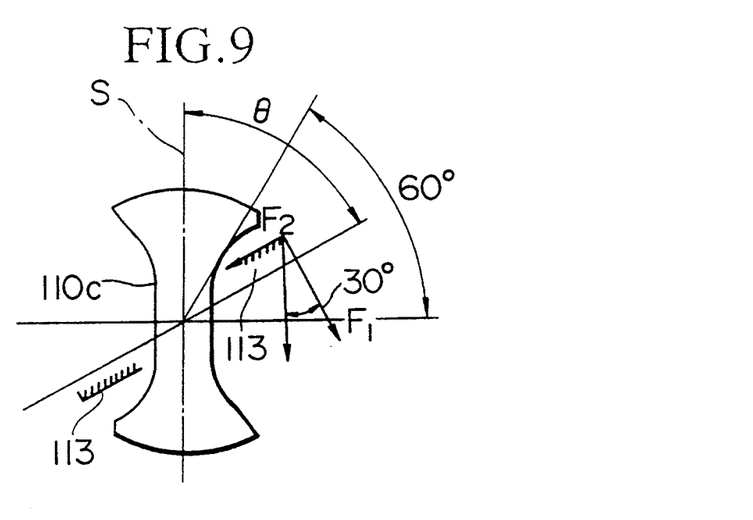
FIG. 9 is a transverse cross-sectional view of the twist drill for explaining the relationship between the location of the straight portion and the location of the cutting edge.

The reason why the cutting edges 113 are inclined with respect to the center line S is to increase the modulus of the section at the straight portion 111c with respect to the vector of the cutting resistance exerted on the cutting edges 113. FIG. 9 shows a cross-sectional view for explaining the relationship between the locations of the cutting edges 113 and the cross section of the straight portion 111c. As shown in FIG. 9, the principal force $F_1$ of the cutting resistance F exerted on the cutting edge 113 is perpendicular to the cutting edge 113, and the back force $F_2$ of the cutting resistance F is directed toward the axis of the tool body 110. In general, the vector of the cutting resistance F is pivoted at an angle of about 30° toward the radially inner direction, so that the direction of the cutting resistance F is parallel to the center line S. At the straight portion 111c, since the modulus of the section is maximal with respect to the force directed to the longitudinal direction of the cross section of the straight portion 111c, the cutting resistance is received in a condition in which the modulus of section is maximal. Therefore, in the twist drill having the above construction, in spite of having a thin structure at the straight portion 111c, the rigidity against the bending force caused by the cutting resistance is large, and therefore the vibration during drilling operation can be effectively prevented.

In the above embodiment, the spiral portion of the flute 111 consists of the first spiral portion 111a and the second spiral portion 111b. Variations of this construction are possible; for example, the spiral portion may be a single spiral portion in which the helix angle thereof varies toward the straight portion 111c from the front end of the tool body 110. Furthermore, although the cutter bit 112 is soldered to the tool body 110 in the above embodiment, the present invention can be applied to a solid drill, which can obtain the same advantages as the above embodiment. Moreover, the flute-width ratio is increased and the helix angle of the flute is decreased toward the rear end of the tool body 110 in the above embodiment; however, the present invention is not limited to such a construction, and many variations are possible.

Figure 10:
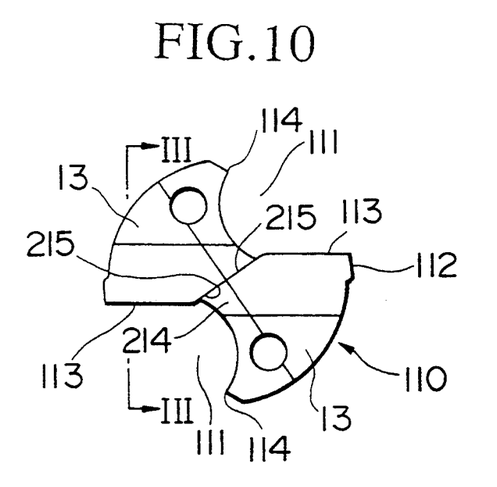
FIG. 10 is an end view of the twist drill in FIG. 5.

The above twist drill of the embodiment has further characterizing features. FIG. 10 shows an end view of the above twist drill. As shown in FIG. 10, the flank face 13 of the tool body 110 and the cutter bit 112 is processed with web thinning at the vicinity of the heel 114 by removing a wall portion thereof toward the direction counter to the cutting direction so as to form a thinning portion 214. The thinning portions 214 define an X-shape in end view. The web thinning process forms differences in level between the flank face 13 and the thinning portions 214. A second cutting edge 215 is formed at the edge line of the difference in level. The second cutting edge 215 extends from the radially inner end of the cutting edge 113 to the vicinity of the axis of the tool body 110.

Figure 11:
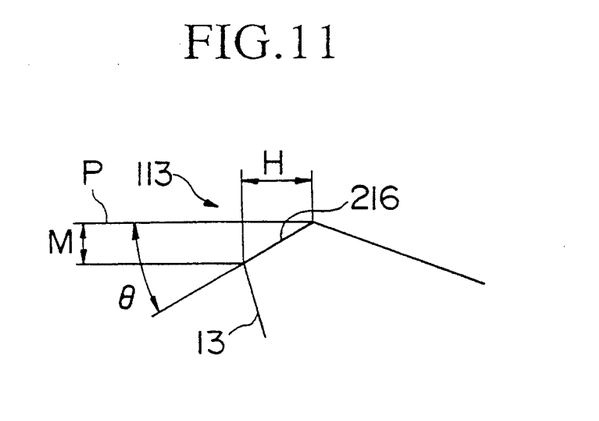
FIG. 11 is a cross-sectional view taken along the line 11—11 in FIG. 10.
Figure 12:
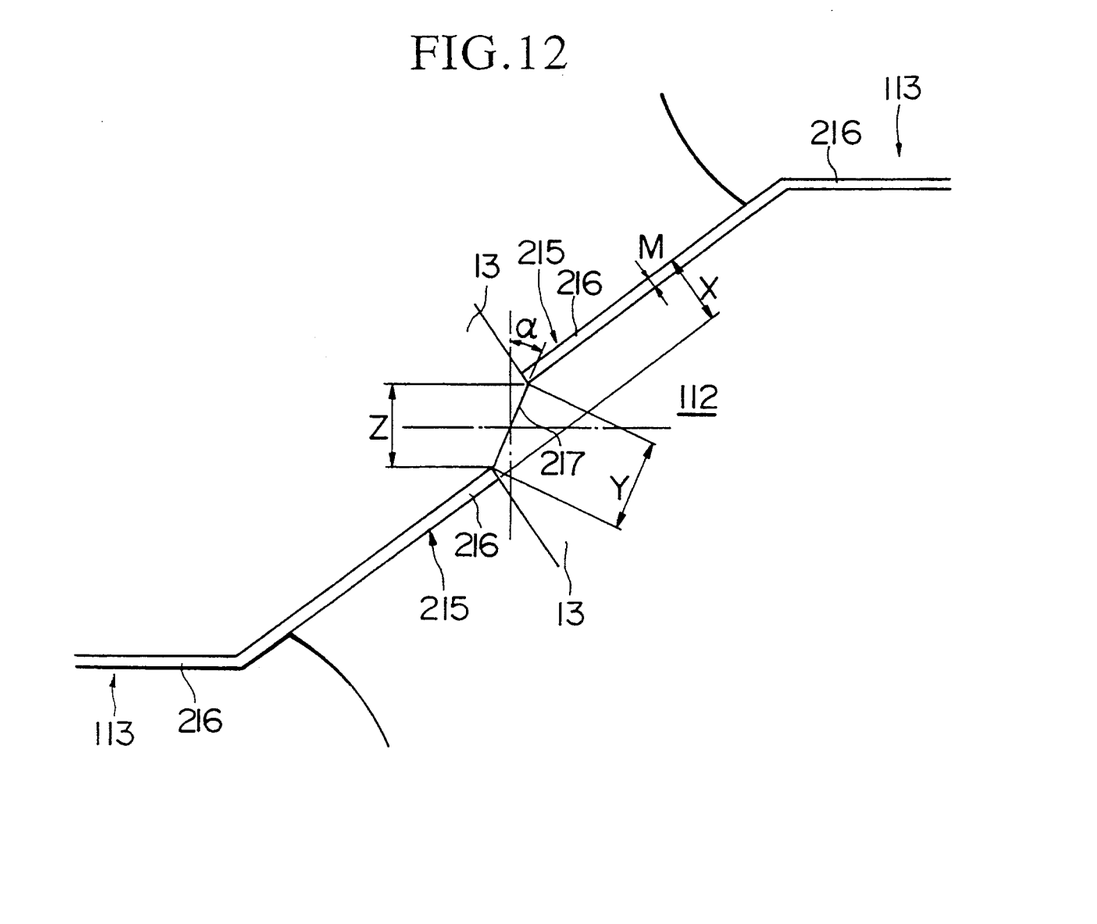
FIG. 12 is an enlarged end view of the portion in the vicinity of the rotational axis of the twist drill in FIG. 5.

The cutting edge 113 and the second cutting edge 215 are formed with honing portion 216. As shown in FIG. 11, the honing portion 216 is defined by a plane face which inclines in a predetermined angle $\theta$ with respect to a plane P perpendicular to the axis of the tool body 110. The angle $\theta$ is set in a range of 10° through 45°. The height H of the honing portion 216 is set in a range of 0.03 mm through 0.3 mm. The width M of the honing portion 216 is defined in accordance with the angle $\theta$ and the width H. The second cutting edges 215 are separated from each other toward the substantial cutting direction which is parallel to the cutting edge 113 when viewed from the front as shown in FIG. 12. A chisel edge 217 is formed between the intersection of two front flank faces 13 so as to connect the radially inner ends of the second cutting edges 215.

The length Y of the chisel edge 217 is set in a range of 0.02 D through 0.05 D. In order to obtain the thickness of the wall in the vicinity of the rotational axis of the tool body 110, at least 0.02 D for length Y is required. The strength of the wall portion in the vicinity of the rotational axis is affected by the width Z viewed from the cutting edge 113 rather than the length Y. The chisel edge angle $\alpha$ between the chisel edge 217 and the line perpendicular to the cutting edge 113 is generally set in the range of 15° through 35°. Therefore, the chisel edge angle $\alpha$ is in a general range, in which the required strength of the wall portion in the vicinity of the rotational axis is ensured.

When the chisel edge angle $\alpha$ is not considered, the distance X between the second cutting edges 215 in a direction perpendicular to the second cutting edge 215 should be set in a range of 0.01 D through 0.02 D. In order to obtain a sufficient length of the width Z, at least 0.01 D of length Y is required.

In the twist drill constructed as above, since the length Y is set at 0.05 D or less, vibration of the tool body 110 when the cutting edge 113 engages a workpiece can be prevented, and thrust load can be reduced as in the conventional twist drill. Furthermore, in the above twist drill, since the length Y is set at 0.02 D or more, the strength of the portion in the vicinity of the rotational axis of the tool body 110 can be increased, so that breakage thereof can be prevented.

In the above embodiment, although the honing portion 216 is in the shape of a plane face, the honing portion can also be a convex face. Moreover, since the configuration of the cutting edge 113 is not limited to a straight shape, the cutting edge 113 can also be a curved line.

What is claimed is:

1. A twist drill comprising:
   a substantially cylindrical tool body having a rotational axis therethrough, a front portion, a rear portion, a front flank face, a plurality of web thicknesses, a plurality of flutes formed on an outer peripheral surface thereof and extending to the front flank face, and a land disposed between a pair of the flutes, said flute having a wall portion facing toward the rotational direction of the tool body; and
   a cutting edge formed at an intersection between said wall portion for the flute and said front flank face;
   said flute consisting of a spiral portion opening to the front flank face and a straight portion extending from the rear end of said spiral portion toward the rear portion of the tool body and extend in parallel to the axis of said body, and the web thickness at said straight portion being less than the web thickness at said spiral portion.

2. A twist drill in accordance with claim 1, wherein a flute-width ratio defined by the ratio of arc length of said flute to arc length of said land at a cross-section taken perpendicular to said axis of the tool body at the rear portion of the tool body is larger than the flute-width ratio at the front portion of the tool body.

3. A twist drill in accordance with claim 1, wherein said spiral portion comprises a first spiral portion having a constant helix angle and opening to said front flank face, and a second spiral portion extending from the rear end of said first spiral portion toward the rear portion of the tool body.

4. A twist drill in accordance with claim 3, wherein the flute-width ratios at said first spiral portion and at said straight portion are constant, the flute-width ratio at said second spiral portion gradually increases toward said rear end so as to smoothly connect the second spiral portion to the first spiral portion and to the straight portion.

5. A twist drill in accordance with claim 1, wherein said cutting edges are inclined at a predetermined angle toward the direction counter to the rotational direction thereof with respect to a longitudinal center line of a cross section of said straight portion, said predetermined angle is in a range of 30° to 90°.

6. A twist drill in accordance with claim 5, wherein a flute-width ratio at said straight portion is in a range of 1.0 through 1.5, the web thickness at said straight portion is in a range of 0.15 D through 0.30 D.

7. A twist drill in accordance with claim 1, further comprises a web thinning portions formed on the front flank face including a web portion thereof; second cutting edges formed by a thinning process for said web thinning portions, said second cutting edges extend from radially inner ends of said cutting edges toward a portion in the vicinity of said axis of said tool body.

8. A twist drill in accordance with claim 7, wherein a honing portion formed by honing is formed at said first cutting edge and said second cutting edge.

9. A twist drill in accordance with claim 8, wherein said second cutting edges are separated from each other when viewed from said front end of said tool body, a chisel edge which connects said radially inner ends of said second cutting edges is formed at an intersection between said front flank faces, the length of said chisel edge is in the range of 0.02 D to 0.05 D.

10. A twist drill in accordance with claim 9, the distance between said second cutting edges in the direction perpendicular to the second cutting edge is set in a range of 0.01 D to 0.02 D.

* * * * *